United States Patent
Wright

(10) Patent No.: US 12,507,735 B2
(45) Date of Patent: Dec. 30, 2025

(54) METHOD FOR RECYCLING AN AEROSOL GENERATING ARTICLE

(71) Applicant: JT International SA, Geneva (CH)

(72) Inventor: Alec Wright, Guildford (GB)

(73) Assignee: JT International SA (CH)

( * ) Notice: Subject to any disclaimer, the term of this patent is extended or adjusted under 35 U.S.C. 154(b) by 272 days.

(21) Appl. No.: 17/767,590

(22) PCT Filed: Oct. 8, 2020

(86) PCT No.: PCT/EP2020/078347
§ 371 (c)(1),
(2) Date: Apr. 8, 2022

(87) PCT Pub. No.: WO2021/074014
PCT Pub. Date: Apr. 22, 2021

(65) Prior Publication Data
US 2023/0147341 A1 May 11, 2023

(30) Foreign Application Priority Data

Oct. 13, 2019 (EP) .................................. 19202878

(51) Int. Cl.
*A24F 40/465* (2020.01)
*A24F 40/20* (2020.01)
*B09B 3/35* (2022.01)
*B09B 101/15* (2022.01)

(52) U.S. Cl.
CPC ............ *A24F 40/465* (2020.01); *A24F 40/20* (2020.01); *B09B 3/35* (2022.01); *B09B 2101/15* (2022.01)

(58) Field of Classification Search
None
See application file for complete search history.

(56) References Cited

U.S. PATENT DOCUMENTS 5,191,904 A * 3/1993 Arents ...................... B07B 1/46
209/393
5,391,864 A 2/1995 Bodor et al.
5,403,998 A 4/1995 Sheen et al.
(Continued)

FOREIGN PATENT DOCUMENTS

CN 201585409 U 9/2010
CN 202819610 U 3/2013
(Continued)

OTHER PUBLICATIONS

WO2019071566A1 Description English Translation obtained from Espacenet, pp. 1-18 (Year: 2024).*
(Continued)

*Primary Examiner* — Philip Y Louie
*Assistant Examiner* — Virginia R Bieger
(74) *Attorney, Agent, or Firm* — Lerner David LLP

(57) ABSTRACT

A method is provided for recycling an aerosol generating article comprising a non-liquid aerosol generating material and an inductively heatable susceptor. The method comprises a first step of shredding the aerosol generating article to break up the non-liquid aerosol material and the inductively heatable susceptor. The method comprises a second step of separating the inductively heatable susceptor and the non-liquid aerosol generating material.

16 Claims, 3 Drawing Sheets

(56) References Cited

U.S. PATENT DOCUMENTS

| | | | |
|---|---|---|---|
| 5,429,310 A | 7/1995 | Keller et al. | |
| 5,890,663 A * | 4/1999 | Strach | B07B 9/00 |
| | | | 241/19 |
| 6,602,810 B1 | 8/2003 | Christensen et al. | |
| 2014/0290671 A1 | 10/2014 | Park et al. | |
| 2015/0272219 A1 | 10/2015 | Hatrick et al. | |
| 2018/0016096 A1 * | 1/2018 | Krishnamurthy | B65F 1/14 |
| 2018/0318569 A1 | 11/2018 | Fryshman | |
| 2021/0112872 A1 | 4/2021 | Rogan et al. | |

FOREIGN PATENT DOCUMENTS

| | | | | |
|---|---|---|---|---|
| CN | 104619202 | A | | 5/2015 |
| CN | 104705780 | A | | 6/2015 |
| CN | 206462398 | U | | 9/2017 |
| CN | 108589047 | A | | 9/2018 |
| DE | 102016212095 | A1 | | 1/2018 |
| GB | 612294 | | * 11/1948 | ............... A24C 5/36 |
| JP | H06-070843 | A | | 3/1994 |
| JP | H07-051043 | A | | 2/1995 |
| JP | 2005168361 | A | | 6/2005 |
| JP | 2006-165064 | A | | 6/2006 |
| JP | 2021524254 | A | | 9/2021 |
| WO | 2013064352 | A1 | | 5/2013 |
| WO | 2013075791 | A1 | | 5/2013 |
| WO | WO-2014015924 | A1 | * 1/2014 | ............... A24C 5/36 |
| WO | 2018146071 | A1 | | 8/2018 |
| WO | 2019030353 | A1 | | 2/2019 |
| WO | WO-2019071566 | A1 | * 4/2019 | |
| WO | 2019157177 | A1 | | 8/2019 |

OTHER PUBLICATIONS

International Search Report for PCT/EP2020/078347 dated Dec. 10, 2020. 3 pgs.

Search Report for TW Application No. 109134925 dated Oct. 31, 2023. 1 pg.

Office Action for Chinese Application No. 202080071549.3 issued Jan. 23, 25. 8 pgs.

"Recyclingtechnik-Fachbuch für Lehre und Praxis (Recycling technology-special manual for teaching and experiment)", Hans Martens, Daniel Goldmann et al., pp. 22-24, ISBN 978-3-658-02785-8, Dec. 2016. 6 pages. <<https://link.springer.com/book/10.1007/978-3-658-02786-5>> (See Chinese Office Action for Application No. 202080071549.3 issued Jan. 23, 25 for concise explanation of relevance).

* cited by examiner

METHOD FOR RECYCLING AN AEROSOL GENERATING ARTICLE

CROSS-REFERENCE TO RELATED APPLICATIONS

The present application is a national phase entry under 35 U.S.C. § 371 of International Application No. PCT/EP2020/078347, filed Oct. 8, 2020, published in English, which claims priority to European Patent Application No. 19202878.5, filed Oct. 13, 2019, the disclosures of which are incorporated herein by reference.

TECHNICAL FIELD

The present disclosure relates generally to aerosol generating articles, and more particularly to an aerosol generating article for use with an aerosol generating device for heating the aerosol generating article to generate an aerosol for inhalation by a user. Embodiments of the present disclosure relate in particular to a method for recycling an aerosol generating article which employs a non-liquid aerosol generating material and an inductively heatable susceptor.

TECHNICAL BACKGROUND

Devices which heat, rather than burn, a non-liquid aerosol generating material to produce an aerosol for inhalation have become popular with consumers in recent years.

Such devices can use one of a number of different approaches to provide heat to the aerosol generating material. One such approach is to provide an aerosol generating device which employs an induction heating system. In such a device, an induction coil is provided with the device and an inductively heatable susceptor is also provided. Electrical energy is supplied to the induction coil when a user activates the device which in turn generates an alternating electromagnetic field. The susceptor couples with the electromagnetic field and generates heat which is transferred, for example by conduction, to the non-liquid aerosol generating material and an aerosol is generated as the aerosol generating material is heated.

It can be convenient to provide the non-liquid aerosol generating material and the inductively heatable susceptor in the form an aerosol generating article which can be inserted by a user into an aerosol generating device. As such, there is a need to mitigate problems associated with the disposal of such aerosol generating articles after they have been used or if they are off-specification.

SUMMARY OF THE DISCLOSURE

According to a first aspect of the present disclosure, there is provided a method for recycling an aerosol generating article comprising a non-liquid aerosol generating material and an inductively heatable susceptor, the method comprising:

(i) shredding the aerosol generating article to break up the non-liquid aerosol material and the inductively heatable susceptor; and (ii) separating the inductively heatable susceptor and the non-liquid aerosol generating material.

According to a second aspect of the present disclosure, there is provided a method for manufacturing an aerosol generating article, the method comprising:

positioning the separated inductively heatable susceptor obtained by the method according to the first aspect proximate a further non-liquid aerosol generating material to form an aerosol generating article.

According to a third aspect of the present disclosure, there is provided a method for manufacturing an aerosol generating article, the method comprising:

separating an inductively heatable susceptor and a non-liquid aerosol generating material in a used or off-specification aerosol generating article; and positioning the separated inductively heatable susceptor proximate a further non-liquid aerosol generating material to form an aerosol generating article.

The aerosol generating article is intended for use with an aerosol generating device for heating the non-liquid aerosol generating material, without burning the non-liquid aerosol generating material, to volatise at least one component of the aerosol generating material and thereby generate a vapour which cools and condenses to form an aerosol for inhalation by a user of the aerosol generating device.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms 'aerosol' and 'vapour' may be used interchangeably in this specification, particularly with regard to the form of the inhalable medium that is generated for inhalation by a user.

The inductively heatable susceptor may comprise a single susceptor or may comprise a plurality of susceptor elements.

The inductively heatable susceptor may comprise at least one of a metal material, a metal alloy material, a ceramic material, a carbon material, and a polymeric fibre material coated with a metal material. The inductively heatable susceptor may comprise one or more, but not limited, of aluminium, iron, nickel, stainless steel and alloys thereof, e.g. Nickel Chromium or Nickel Copper.

The methods according to the present disclosure help to reduce the environmental impact associated with disposal of a used or off-specification aerosol generating article by enabling the inductively heatable susceptor to be separated from the non-liquid aerosol generating material and thereafter re-used or further recycled. The methods according to the present disclosure may also help to reduce the production cost associated with manufacture of an aerosol generating article through re-use of a separated inductively heatable susceptor.

Step (i) may include shredding the non-liquid aerosol generating material. This may facilitate separation of the inductively heatable susceptor and the non-liquid aerosol generating material.

The inductively heatable susceptor may be a continuous susceptor and may comprise at least one of a mesh form and a fibre cloth form. In some implementations, the continuous susceptor may comprise at least one of a metal mesh laminate and a metal fibre cloth laminate. Step (i) may include shredding the continuous susceptor. This may facilitate separation of the inductively heatable susceptor and the non-liquid aerosol generating material.

In embodiments in which the inductively heatable susceptor comprises a plurality of susceptor elements, the inductively heatable susceptor may comprise a particulate susceptor material. For example, the particulate susceptor material may comprise at least one of a granular form, a powder form, and a fibre form. The particulate susceptor material may be distributed throughout the non-liquid aerosol generating material. Step (i) may, therefore, involve shredding only the non-liquid aerosol generating material.

Step (ii) may comprise vibrating the shredded aerosol generating article to separate the inductively heatable susceptor and the non-liquid aerosol generating material. The use of vibration may provide a convenient way to separate the inductively heatable susceptor and the non-liquid aerosol generating material. Step (ii) may comprise depositing the shredded aerosol generating article on a vibrating screen unit having apertures therein to separate the inductively heatable susceptor and the non-liquid aerosol generating material. The apertures in the vibrating screen unit may be sized to allow passage therethrough of the non-liquid aerosol generating material and to retain on a retaining surface thereof the inductively heatable susceptor.

Step (ii) may comprise exposing the shredded aerosol generating article to a magnetic force to separate the inductively heatable susceptor from the non-liquid aerosol generating material. Since the inductively heatable susceptor comprises a magnetic material, it may be convenient to use a magnetic force to separate the inductively heatable susceptor and the non-liquid aerosol generating material. Step (ii) may comprise applying the magnetic force using a magnet, for example using an electromagnet. The magnet may be positioned above the shredded aerosol generating article so that the inductively heatable susceptor is attracted towards the magnet in a generally upwards direction.

The above examples are non-limiting and step (ii) may, for example, comprise the use of a robotic picking arm to remove the inductively heatable susceptor from the non-liquid aerosol generating material.

Step (ii) may comprise:
depositing the shredded aerosol generating article on a vibrating screen unit having apertures therein sized to allow passage therethrough of the non-liquid aerosol generating material and to retain on a retaining surface thereof the inductively heatable susceptor; and
exposing the inductively heatable susceptor retained on the surface of the vibrating screen unit to a magnetic force to remove the inductively heatable susceptor from the surface.

The use of both vibration and a magnetic force may help to ensure reliable separation of the inductively heatable susceptor and the non-liquid aerosol generating material.

The aerosol generating article may comprise one or more of a paper wrapper and a filter, and step (i) may comprise shredding the paper wrapper and/or the filter. This ensures that the aerosol generating article is opened during the shredding step to allow separation of the inductively heatable susceptor and the non-liquid aerosol generating material. The filter may comprise cellulose acetate fibres. The filter may be in abutting coaxial alignment with the non-liquid aerosol generating material.

The apertures in the vibrating screen unit may be sized to retain the shredded paper wrapper and/or the shredded filter on the retaining surface. This allows the paper wrapper and/or the filter to be separated from the inductively heatable susceptor and the non-liquid aerosol generating material.

The method may further comprise cleaning the separated inductively heatable susceptor. This may allow the separated inductively heatable susceptor to be re-used in the subsequent manufacture of an aerosol generating article or for another purpose.

The method may further comprise analysing the separated inductively heatable susceptor to determine one or more of the mechanical and electrical properties thereof. The outcome of the analysis may advantageously be used to determine whether the separated inductively heatable susceptor is suitable for re-use in the subsequent manufacture of an aerosol generating article or whether it is better suited for another purpose.

The step of analysing the separated inductively heatable susceptor may be performed after the step of cleaning the separated inductively heatable susceptor. This may allow the analysis to be performed more reliably.

The non-liquid aerosol generating material may be any type of solid or semi-solid material. Example types of aerosol generating solids include powder, granules, pellets, shreds, strands, particles, gel, strips, loose leaves, cut leaves, cut filler, porous material, foam material or sheets. The non-liquid aerosol generating material may comprise plant derived material and in particular, may comprise tobacco. It may advantageously comprise reconstituted tobacco.

The non-liquid aerosol generating material may comprise an aerosol-former. Examples of aerosol-formers include polyhydric alcohols and mixtures thereof such as glycerine or propylene glycol. Typically, the non-liquid aerosol generating material may comprise an aerosol-former content of between approximately 5% and approximately 50% on a dry weight basis. In some embodiments, the non-liquid aerosol generating material may comprise an aerosol-former content of between approximately 10% and approximately 20% on a dry weight basis, and possibly approximately 15% on a dry weight basis.

Upon heating, the non-liquid aerosol generating material may release volatile compounds. The volatile compounds may include nicotine or flavour compounds such as tobacco flavouring.

The aerosol generating article may be elongate and may be substantially cylindrical. The aerosol generating article may be formed substantially in the shape of a stick. The cylindrical shape of the aerosol generating article with its circular cross-section may advantageously facilitate insertion of the aerosol generating article into a heating compartment of an induction heating assembly of an aerosol generating device, for example in which the induction heating assembly includes a helical induction coil having a circular cross-section.

DETAILED DESCRIPTION OF EMBODIMENTS

Embodiments of the present disclosure will now be described by way of example only and with reference to the accompanying drawings.

Figure 1:
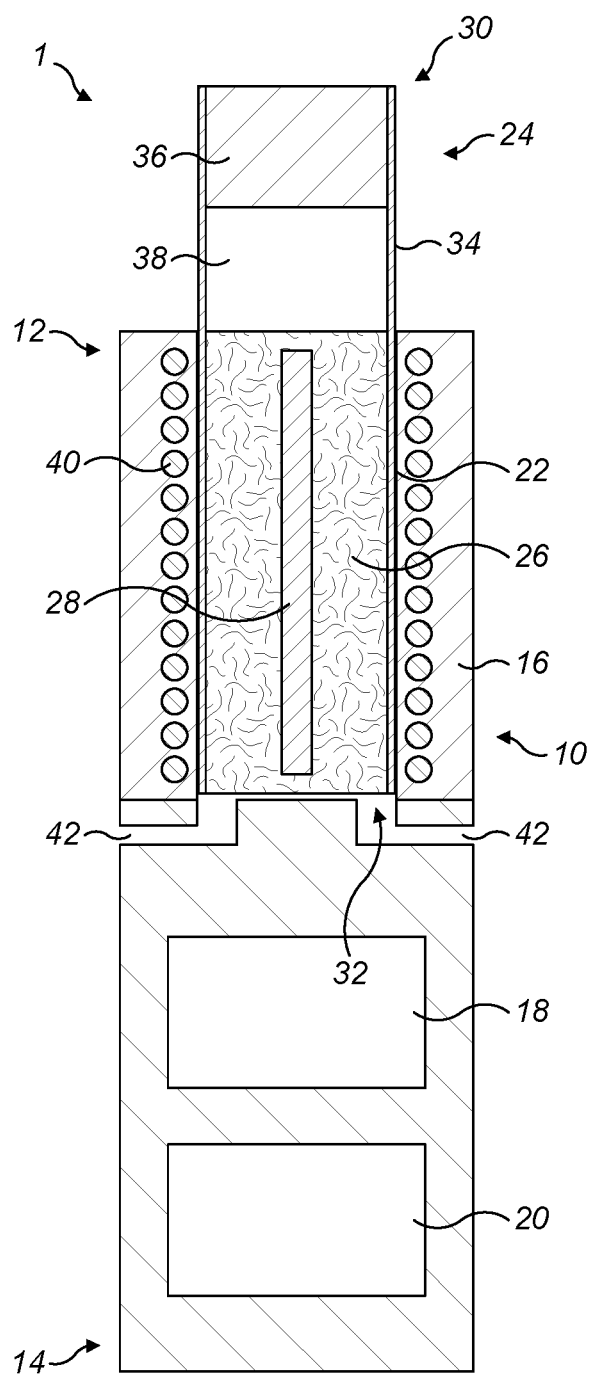
FIG. 1 is diagrammatic cross-sectional view of an example of an aerosol generating system comprising an aerosol generating device and an aerosol generating article.

Referring initially to FIG. 1, there is shown diagrammatically an example of an aerosol generating system 1. The aerosol generating system 1 comprises an aerosol generating device 10 and an aerosol generating article 24. The aerosol generating device 10 has a proximal end 12 and a distal end 14 and comprises a device body 16 which includes a power source 18 and a controller 20 which may be configured to operate at high frequency. The power source 18 typically comprises one or more batteries which could, for example, be inductively rechargeable.

The aerosol generating device 10 is generally cylindrical and comprises a generally cylindrical cavity 22, for example in the form of a heating compartment, accessible from the proximal end 12 of the aerosol generating device 10. The cylindrical cavity 22 is arranged to receive a correspondingly shaped generally cylindrical or rod-shaped aerosol generating article 24 containing a non-liquid aerosol generating material 26 and an inductively heatable susceptor 28. The inductively heatable susceptor 28 is a single continuous susceptor, but in other (non-illustrated) embodiments, the inductively heatable susceptor 28 may comprise a plurality of susceptor elements and could, for example, comprise a particulate susceptor material.

The aerosol generating article 24 is a disposable article and the non-liquid aerosol generating material 26 is typically a solid or semi-solid material. Examples of suitable aerosol forming solids include powder, granules, particles, gel, strips, loose leaves, cut filler, pellets, powder, shreds, strands, foam material and sheets. The aerosol generating material 26 typically comprises plant derived material and, in particular, comprises tobacco.

The aerosol generating material 26 typically comprises an aerosol-former such as glycerine or propylene glycol. Typically, the aerosol generating material 26 may comprise an aerosol-former content of between approximately 5% and approximately 50% on a dry weight basis. Upon heating, the aerosol generating material 26 releases volatile compounds possibly including nicotine or flavour compounds such as tobacco flavouring.

The aerosol generating article 24 has first and second ends 30, 32 and comprises a paper wrapper 34 surrounding the aerosol generating material 26. The aerosol generating article 24 also comprises a filter 36 at the first end 30 which projects from the device body 16 at the proximal end 12. The filter 36 acts as a mouthpiece and comprises an air-permeable plug, for example comprising cellulose acetate fibres. The aerosol generating article 24 also comprises a vapour cooling region 38 positioned between the aerosol generating material 26 and the filter 36.

The aerosol generating device 10 comprises a helical induction coil 40 which has a circular cross-section and which extends around the cylindrical cavity 22. The induction coil 40 can be energised by the power source 18 and controller 20. The controller 20 includes, amongst other electronic components, an inverter which is arranged to convert a direct current from the power source 18 into an alternating high-frequency current for the induction coil 40. The aerosol generating device 10 also includes one or more air inlets 42 in the device body 16 which allow ambient air to flow into the cavity 22.

As will be understood by one of ordinary skill in the art, when the induction coil 40 is energised during use of the aerosol generating system 1, an alternating and time-varying electromagnetic field is produced. This couples with the inductively heatable susceptor 28 and generates eddy currents and/or magnetic hysteresis losses in the inductively heatable susceptor 28 causing it to heat up. The heat is then transferred from the inductively heatable susceptor 28 to the aerosol generating material 26, for example by conduction, radiation and convection.

The inductively heatable susceptor 28 can be in direct or indirect contact with the aerosol generating material 26, such that when the susceptor 28 is inductively heated by the induction coil 40, heat is transferred from the susceptor 28 to the aerosol generating material 26, to heat the aerosol generating material 26 and thereby produce a vapour. The vaporisation of the aerosol generating material 26 is facilitated by the addition of air from the surrounding environment through the air inlets 42. The vapour generated by heating the aerosol generating material 26 flows through the vapour cooling region 38 where it cools and condenses to form an aerosol which can be inhaled by a user of the device 10 through the filter 36. The flow of air and vapour/aerosol through the aerosol generating article 24 is aided by negative pressure created by a user drawing air through the filter 36.

Figure 2:
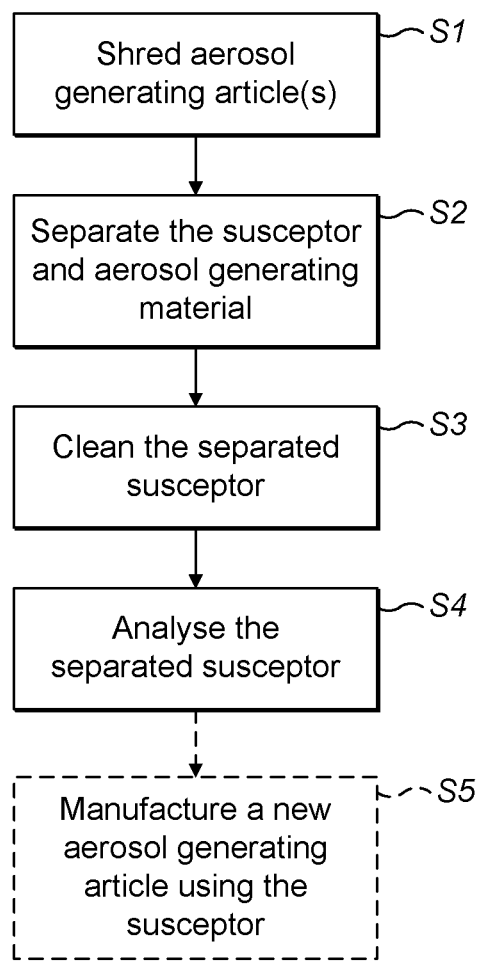
FIG. 2 is a flowchart illustrating an example of a method for recycling an aerosol generating article such as that illustrated in FIG. 1.

Referring now to FIG. 2, there is provided a method for recycling the aerosol generating article 24 illustrated in FIG. 1 or any other example of an aerosol generating article comprising a non-liquid aerosol generating material 26 and an inductively heatable susceptor 28. As noted above, it may be desirable to recycle a used aerosol generating article 24 in which the aerosol generating material 26 has been depleted through use or to recycle an off-specification aerosol generating article 24.

In a first step S1, the method comprises shredding the aerosol generating article 24 to break up the non-liquid aerosol generating material 26 and the inductively heatable susceptor 28. In a second step S2, the method comprises separating the inductively heatable susceptor 28 and the non-liquid aerosol generating material 26.

Figure 3:
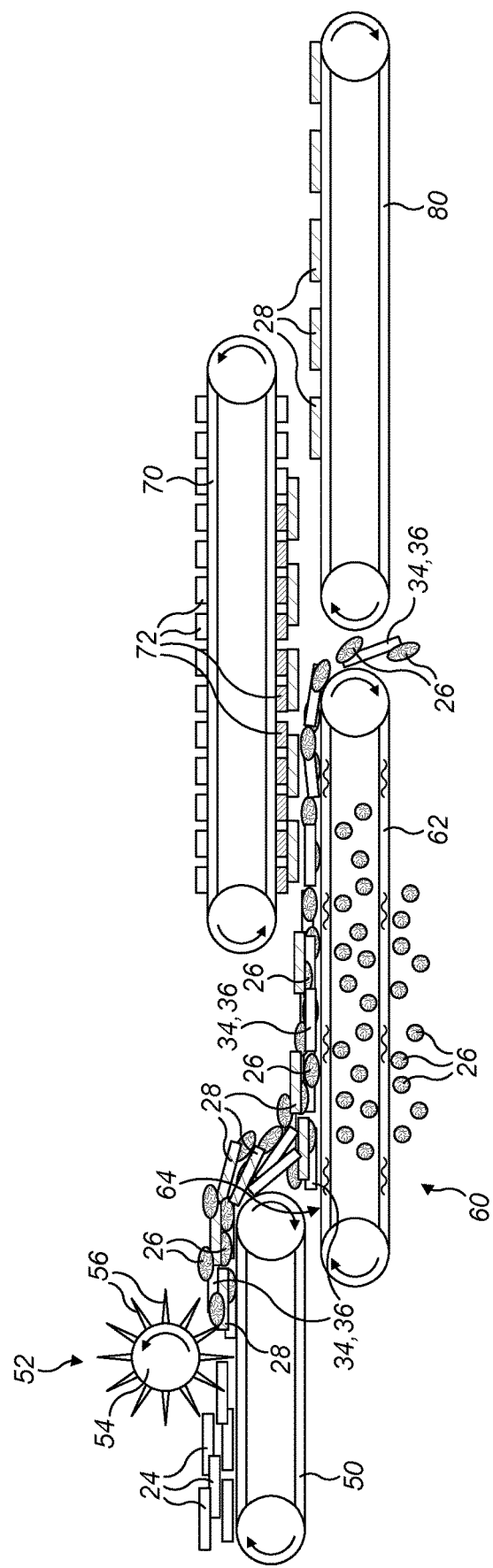
FIG. 3 is a diagrammatic side view of an example of an apparatus for recycling an aerosol generating article and suitable for performing the example of the method illustrated in FIG. 2.

In more detail and referring to FIG. 3 which shows an example of an apparatus for performing the recycling method illustrated in FIG. 2, a plurality of used and/or off-specification aerosol generating articles 24 may be collected and deposited on a first conveyor 50. The apparatus may comprise a shredding unit 52 positioned above first conveyor 50 which may be arranged to perform step S1 of the method described above with reference to FIG. 2, namely to shred the aerosol generating articles 24 positioned on the first conveyor 50 to break up the non-liquid aerosol generating material 26 and the inductively heatable susceptor 28.

In the illustrated and non-limiting example, the shredding unit 52 comprises a shredding roller 54 which may include a plurality of circumferentially arranged shredding formations 56 configured to cut open and shred the aerosol generating articles 24 positioned on the first conveyor 50. The shredding formations 56 may be configured to shred at least the aerosol generating material 26, and possibly to shred the paper wrappers 34 and the filters 36. In the illustrated embodiment in which the inductively heatable susceptors 28 are continuous susceptors, the inductively heatable susceptors 28 are not shredded by the shredding formations 56 and remain intact. In other (non-illustrated) embodiments in which the inductively heatable susceptors 28 are continuous susceptors, the shredding formations 56 may also be configured to shred the inductively heatable susceptors 28. Alternatively, and as noted above, each of the inductively heatable susceptors 28 may comprise a particulate susceptor material distributed throughout the aerosol generating material 26 which is not subjected to shredding by the shredding formations 56.

The apparatus further comprises a vibrating screen unit 60 in the form of a vibrating screen conveyor 62 (second conveyor) which may be arranged to perform step S2 of the method described with reference to FIG. 2, namely to separate the inductively heatable susceptors 28 and the aerosol generating material 26. In more detail, the vibrating screen conveyor 62 is arranged to receive the separated components of the shredded aerosol generating articles 24 from the first conveyor 50, namely the shredded aerosol generating material 26, the inductively heatable susceptors 28, the paper wrappers 34 and the filters 36. In the illustrated example, the vibrating screen conveyor 62 includes a plurality of apertures (not shown) which are sized to allow passage therethrough of some of the non-liquid aerosol generating material 26 and to retain on an upper retaining surface 64 the remainder of the aerosol generating material 26 along with the inductively heatable susceptors 28, the paper wrappers 34 and the filters 36. As will be understood by one of ordinary skill in the art, the vibration applied to the vibrating screen conveyor 62 promotes the passage of appropriately sized non-liquid aerosol generating material 26 through the apertures and into a collector (not shown) which may be positioned below the vibrating screen conveyor 62.

The apparatus includes a third conveyor 70 which is arranged above the vibrating screen conveyor 62 to partially overlap it and which may be arranged to perform step S2 of the method described above with reference to FIG. 2, namely to separate the inductively heatable susceptors 28 and the aerosol generating material 26. In more detail, the third conveyor 70 includes a plurality of electromagnets 72 which can be individually and selectively activated or deactivated. When an individual electromagnet 72 is activated, it is placed in a magnetised state and generates an attractive magnetic force. Conversely, when an individual electromagnet 72 is deactivated, it is placed in a demagnetised state and does not generate an attractive magnetic force. The activated (magnetised) electromagnets 72 are identified in FIG. 3 by the presence of cross-hatching, whereas the deactivated (demagnetised) electromagnets 72 are identified by the absence of cross-hatching.

The apparatus is configured so that the electromagnets 72 positioned directly above the vibrating screen conveyor 62 are activated and placed in the magnetised state. This causes the inductively heatable susceptors 28 on the upper retaining surface 64 of the vibrating screen conveyor 62 to be attracted in an upwards direction towards the magnetised electromagnets 72. The shredded inductively heatable susceptors 28 are then carried by the third conveyor 70 and deposited onto a fourth conveyor 80 which is positioned beneath, and which partially overlaps, the third conveyor 70. In order to deposit the separated inductively heatable susceptors 28 on the fourth conveyor 40, the electromagnets 72 are simply deactivated to place them into the demagnetised state so that the inductively heatable susceptors 28 can fall from the third conveyor 70 onto the surface of the fourth conveyor 80.

After the inductively heatable susceptors 28 have been removed from the upper retaining surface 64 of the vibrating screen conveyor 62 by the electromagnets 72 on the third conveyor 70, the aerosol generating material 26, along with the paper wrappers 34 and filters 36, remaining on the upper retaining surface 64 are ejected from the end of the vibrating screen conveyor 62 and can be collected for disposal and/or further processing.

Similarly, the inductively heatable susceptors 28 that have been deposited on the surface of the fourth conveyor 80 can be ejected from the end of the fourth conveyor 80. Referring again to FIG. 2, in some embodiments, the inductively heatable susceptors 28 may be cleaned in step S3, for example washed to remove deposits and/or other contaminants. Thereafter, the inductively heatable susceptors 28 may be analysed in step S4 to determine their mechanical and/or electrical properties. Depending on the outcome of the analysis, one or more of the inductively heatable susceptors 28 could be re-used in an optional step S5 to manufacture further aerosol generating articles or could be further processed and/or subjected to further recycling operations.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Any combination of the above-described features in all possible variations thereof is encompassed by the present disclosure unless otherwise indicated herein or otherwise clearly contradicted by context.

Unless the context clearly requires otherwise, throughout the description and the claims, the words "comprise", "comprising", and the like, are to be construed in an inclusive as opposed to an exclusive or exhaustive sense; that is to say, in the sense of "including, but not limited to".

The invention claimed is:

1. A method for recycling an aerosol generating article comprising a non-liquid aerosol generating material and an inductively heatable susceptor, the method comprising:
   (i) shredding the aerosol generating article to break up the non-liquid aerosol material and the inductively heatable susceptor; and
   (ii) separating the inductively heatable susceptor and the non-liquid aerosol generating material,
   wherein, during the step of shredding, the inductively heatable susceptor is not shredded.

2. The method according to claim 1, wherein the inductively heatable susceptor is a continuous susceptor.

3. The method according to claim 1, wherein the inductively heatable susceptor comprises a particulate susceptor material.

4. The method according to claim 1, wherein step (ii) comprises vibrating the shredded aerosol generating article to separate the inductively heatable susceptor and the non-liquid aerosol generating material.

5. The method according to claim 1, wherein step (ii) comprises depositing the shredded aerosol generating article on a vibrating screen unit having apertures therein to separate the inductively heatable susceptor and the non-liquid aerosol generating material.

6. The method according to claim 5, wherein the apertures in the vibrating screen unit are sized to allow passage therethrough of the non-liquid aerosol generating material and to retain on a retaining surface thereof the inductively heatable susceptor.

7. The method according to claim 1, wherein step (ii) comprises exposing the shredded aerosol generating article to a magnetic force to separate the inductively heatable susceptor from the non-liquid aerosol generating material.

8. The method according to claim 7, wherein step (ii) comprises applying the magnetic force using a magnet.

9. The method according to claim 8, wherein the magnet is positioned above the shredded aerosol generating article so that the inductively heatable susceptor is attracted towards the magnet.

10. The method according to claim 1, wherein step (ii) comprises:
   depositing the shredded aerosol generating article on a vibrating screen unit having apertures therein sized to allow passage therethrough of the non-liquid aerosol generating material and to retain on a retaining surface thereof the inductively heatable susceptor; and exposing the inductively heatable susceptor retained on the surface of the vibrating screen unit to a magnetic force to remove the inductively heatable susceptor from the retaining surface.

11. The method according to claim 5, wherein the aerosol generating article comprises a paper wrapper and a filter, and step (i) comprises shredding the paper wrapper and/or the filter.

12. The method according to claim 11, wherein the apertures in the vibrating screen unit are sized to retain the shredded paper wrapper and/or the shredded filter on the retaining surface.

13. The method according to claim 1, wherein the method further comprises cleaning the separated inductively heatable susceptor.

14. The method according to claim 1, wherein the method further comprises analysing the separated inductively heatable susceptor to determine one or more mechanical or electrical properties thereof.

15. The method according to claim 14, wherein the step of analysing the separated inductively heatable susceptor is performed after the step of cleaning the separated inductively heatable susceptor.

16. The method of claim 8, wherein the magnet is an electromagnet.

* * * * *